Figure 1:
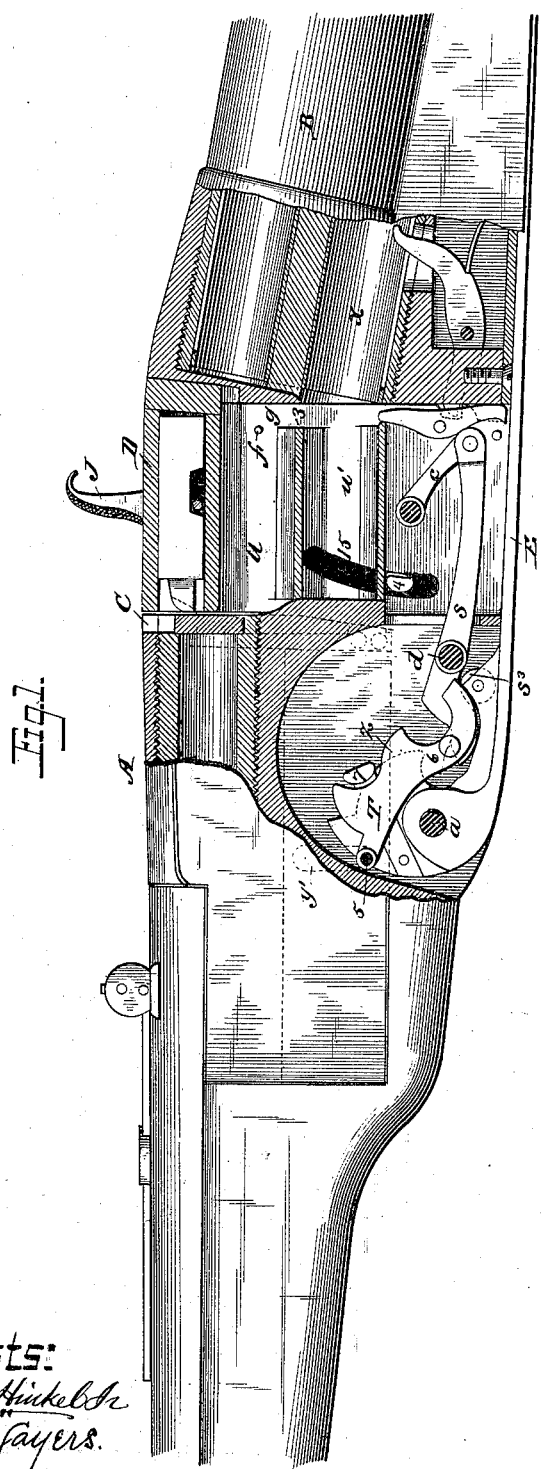

(No Model.)                                                                 4 Sheets—Sheet 1.

T. CULLEN, Dec'd.
P. KERRIN, Executor.
MAGAZINE FIRE ARM.

No. 333,307.                                           Patented Dec. 29, 1885.

Attests:

Inventor:

(No Model.) 4 Sheets—Sheet 2.
T. CULLEN, Dec'd.
P. KERRIN, Executor.
MAGAZINE FIRE ARM.
No. 333,307. Patented Dec. 29, 1885.
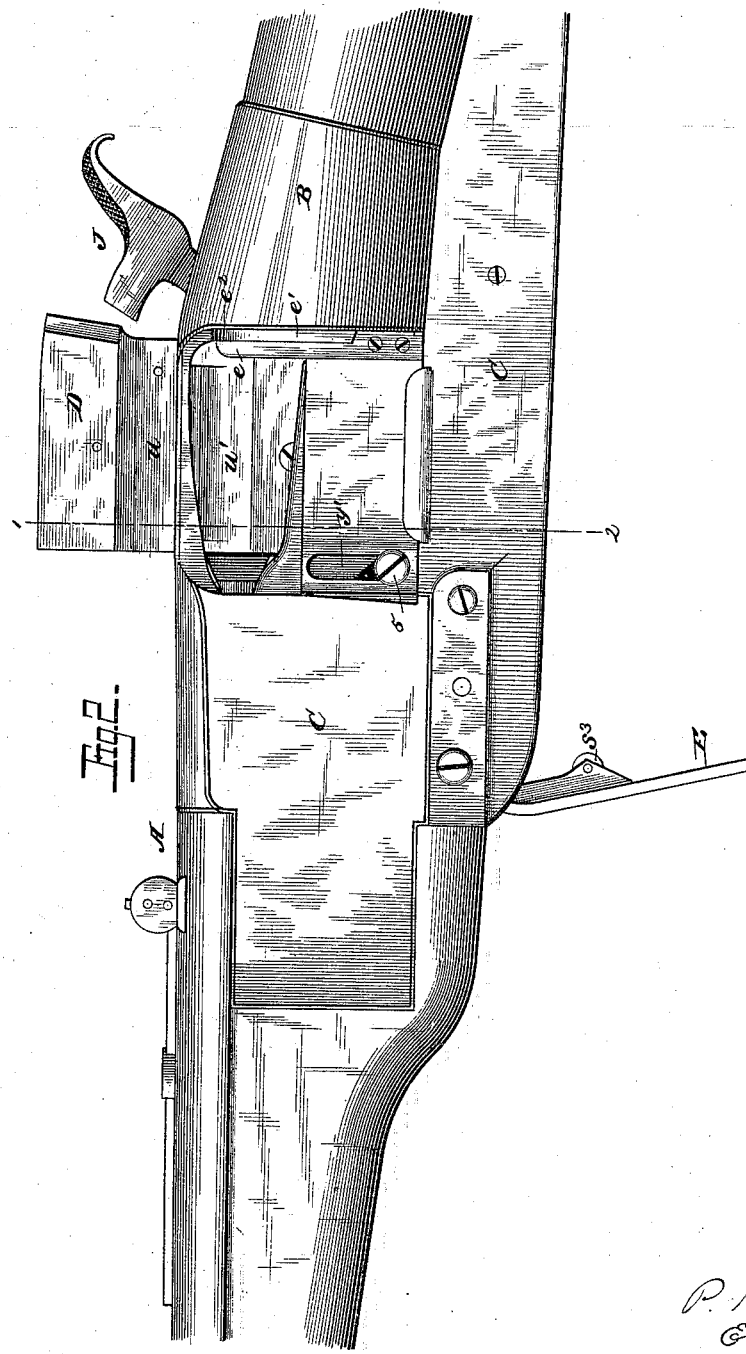

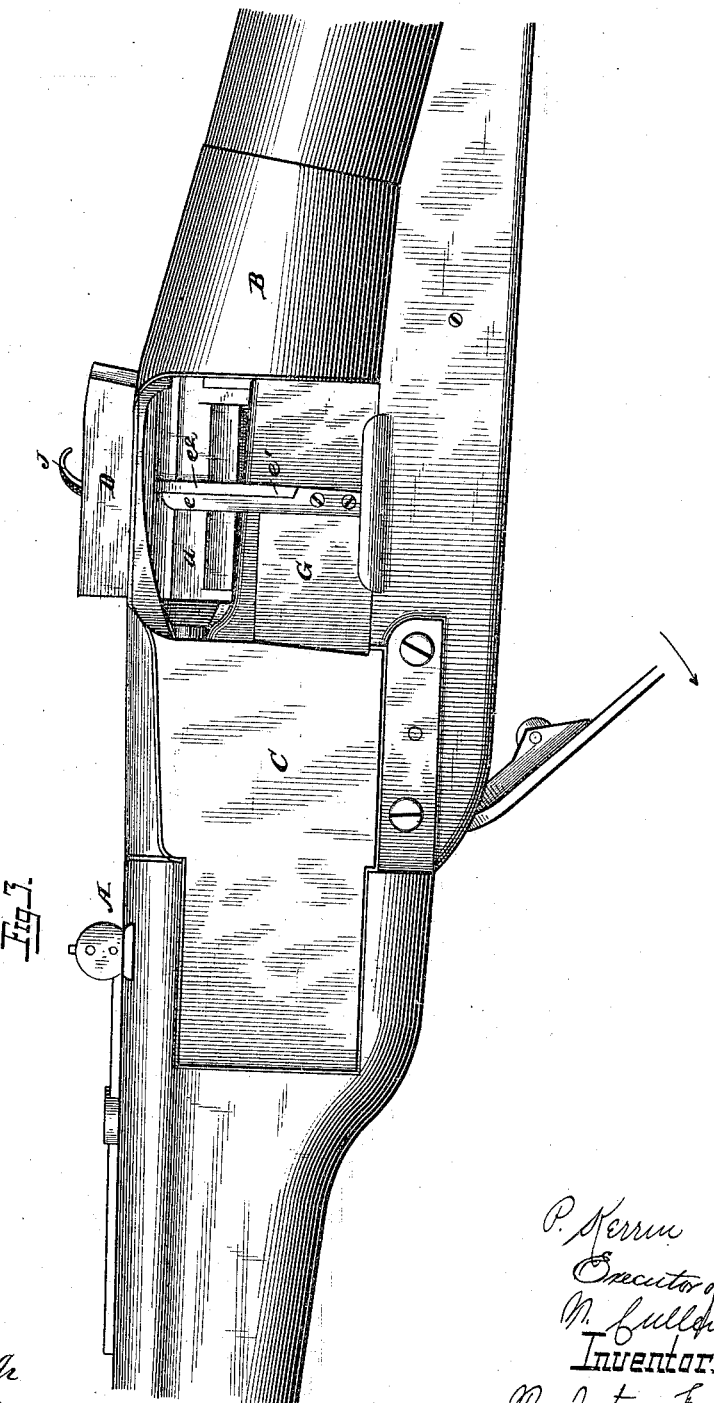

(No Model.) 4 Sheets—Sheet 4.
T. CULLEN, Dec'd.
P. KERRIN, Executor.
MAGAZINE FIRE ARM.
No. 333,307. Patented Dec. 29, 1885.
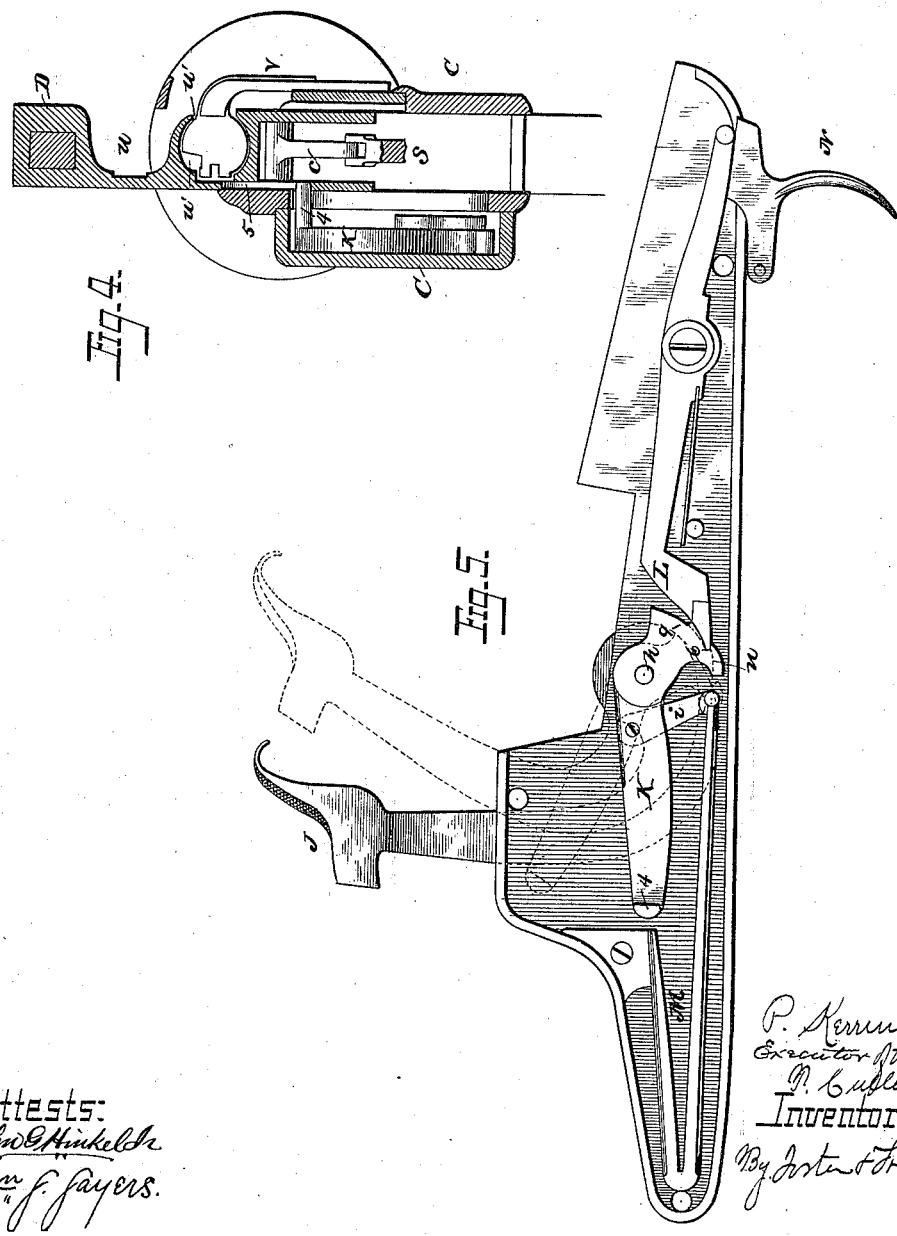

UNITED STATES PATENT OFFICE.

PATRICK KERRIN, OF NEW YORK, N. Y., EXECUTOR OF THOMAS CULLEN, DECEASED.

MAGAZINE FIRE-ARM.

SPECIFICATION forming part of Letters Patent No. 333,307, dated December 29, 1885.

Application filed April 2, 1885. Serial No. 161,051. (No model.)

*To all whom it may concern:*

Be it known that THOMAS CULLEN, deceased, late a citizen of the United States, and a resident of the city, county, and State of New York, did invent certain new and useful Improvements in Fire-Arms, of which the following is a specification.

This invention relates to that class of fire-arms in which the barrel is supplied with cartridges transferred successively from the magazine in the stock; and the invention consists in constructing the breech so that the arm may be used both for hand and magazine loading, according to the extent of the movement imparted to the breech; and the invention also consists in certain details of the arm intended to increase its efficiency.

In the drawings, Figure 1 is a side view in part longitudinal section of a magazine-rifle illustrating my improvements. Fig. 2 is a side view of the arm showing the breech up for use in magazine-loading; Fig. 3, the same, showing the breech up for use in hand-loading; Fig. 4, a cross-section on the line 1 2, Fig. 2; Fig. 5, a view of the lock-plate and its appurtenances detached.

A is the barrel of the arm, and B the stock, which contains a feed-channel, $x$, through which a succession of cartridges is propelled in any suitable manner, and C is the stock, which is open at one side, $v$, Fig. 4, and recessed for the reception of a vertically-sliding breech, D, having two chambers or receptacles, $u$ $u'$, arranged one above the other, as shown in the drawings, and each open at the side which is toward the open side of the stock. The vertical movement of the breech-block is imparted from a lever, E, pivoted to the stock at $a$ and provided with a roller, $s^3$, operating upon the short arm of a lever, S, pivoted to the stock at $d$ and connected by a link, $c$, with the sliding breech-block. Within the stock, and back and forth across the opening $v'$, slides a plate, G, carrying the extractor-finger $e$ and a push-arm, $e'$, enlarged at the inner end to form a push-disk, $e^2$, which, when at the limit of its forward movement, is against the rear end of the barrel. The plate G has a slot, $y'$, dotted lines, Fig. 1, receiving a pin, 5, on a lever, T, pivoted at 6 within the stock, and having an irregular cam-edge, $z$, which is acted upon by a stud, 7, carried by the lever E, to effect the movements described hereinafter. As the lever E swings forward in the direction of the arrow, Fig. 3, the breech-block is raised to bring the receptacle $u$ in line with the bore of the barrel, and remain in this position, when the extractor-finger and disk $e^2$ will be carried back through the receptacle $u$, and will carry with them the cartridge-case until the rim of the latter strikes a pin, $f$, when the cartridge-case will be thrown outward as the disk $e^2$ takes its position above a slot, $g$, in the partition 3, separating the receptacles $u$ $u'$. The slot $g$ permits the breech-block D to rise after the extractor-finger and disk $e^2$ are at the rear of the breech-opening, for a purpose set forth hereinafter. The connections between the breech-block, lever E, and extractor-plate G are such that when the end of the lever E is thrown down to a limited extent the breech-block will be raised to bring the receptacle $u$ in line with the bore, and the extractor-fingers will move back, as above described, throwing out the spent-cartridge case, after which another cartridge may be inserted by hand in the receptacle $u$, when, as the end of the lever E is carried upward, the extractor-finger and disk $e^2$ will move forward and the cartridge will be pushed forward by the disk $e^2$ and will be carried into the bore, after which the breech-block will descend to the position shown in Fig. 1 to close the disk $e^2$ against the breech. The end of the chamber or channel $x$ is closed, except where it is opposite the receptacle $u'$, so that as the latter is brought opposite the said channel a cartridge will be forced forward by the usual spring into the receptacle $u'$; but so long as the lever E is thrown downward only to a limited extent, as above described, the cartridge in the receptacle will prevent further feeding of the cartridges automatically.

When it is desired to use the arm as a magazine-gun, instead of loading by hand, the lever E after the discharge of each spent-cartridge case is thrown down to its full extent, Fig. 2, when the block D will first be carried upward sufficiently to bring the receptacle $u$ opposite the bore, and then will be arrested while the extractor-finger and disk $e^2$ are carried back until the receptacle $u'$ is opposite the bore, after which the finger and disk $e^2$ will move forward through the receptacle $u'$ and force the cartridge into the bore. Upon drawing up the end of the lever E the block D will be brought to the position shown in Fig. 1, another cartridge will be forced from the magazine into the receptacle $u'$, while the breech will be closed preparatory to a second discharge.

As those features of the arm can be fully understood by reference to the patent of T. Cullen for a magazine-gun, dated April 13, 1869, No. 88,853, they need not here be further alluded to.

In connection with the sliding breech having the movements above described, I use a self-cocking arrangement whereby the hammer J is brought to a half-cock when the receptacle $u$ is opposite the bore, and is retained in this position after the block descends to the position shown in Fig. 1, and whereby the said hammer is brought to a full-cock automatically when the block ascends sufficiently to bring the receptacle $u'$ opposite the bore. The arrangement whereby this is effected will be best understood by reference to Figs. 1 and 5. The hammer J is secured to a transverse pin, $h$, carrying an arm, K, within the lock-case, the said arm or cocking-lever having a projecting lug, 4, which extends into a slot, 15, in the block D, so that as the block rises and as the receptacle U is brought in line with the bore the arm K will be lifted at its forward end until a notch, 6, at the rear rounded end of the arm, will be engaged by a spring-locking lever or sear, L, which will prevent the forward end of the arm from descending, as it has a tendency to do under the action of a spring, M, connected to the arm by a link, $i$. The hammer is thus brought to a half-cock and will be retained in this position as the block D descends to the position shown in Fig. 1, which it can do owing to the length of the slot 15. When the block D is raised to its full extent, the arm K is lifted to the position shown in dotted lines, Fig. 5, and the end of the lever L engages with a shoulder, 9, and holds the hammer at full-cock until the forward end of the lever L is thrown downward by drawing back the trigger N.

It will be seen that by the above-described arrangement the automatic full-cocking of the hammer is prevented during the time that the gun is in position to be used for hand-loading, so that the dangers incident to automatic cocking in such instances are obviated. It will also be seen that the notch 6 is formed to make a lip, $n$, which prevents the forward end of the lever L from being thrown down, even when the trigger is pulled when the hammer is at half-cock.

When the barrel is fed automatically from the magazine and rapid firing is required, the hammer is brought to full-cock, and will be released the instant the trigger is touched, so as to secure the desired rapidity of fire, in which case the precautions necessary when the loaded arm is carried from place to place between fires need not be observed.

It will be apparent that other connections than those described may be made between the double-chambered block and the hammer in order to half-cock the hammer when one chamber is used in hand-loading, and in order to full-cock the hammer when the other chamber is used in magazine-loading. I therefore do not limit the said CULLEN'S invention to the special devices illustrated.

I claim—

1. The combination, in a magazine fire-arm, of a barrel, a vertically-reciprocating breech-block arranged to permit the cartridges from the magazine to pass into the lower chamber thereof when the breech is closed, a hammer and its cocking-lever operatively connected to the breech-block and bearing a sear-locking device, whereby movement of the breech-block to bring the upper chamber in line with bore of barrel will bring the hammer to and secure it at half-cock, and extreme upper movement of breech-block full-cocks the hammer, substantially as described.

2. The combination, in a magazine-arm, of the sliding breech-block having two receptacles, a hammer, trigger, cocking-lever mounted on the pivotal pin of the hammer, and having an arm projecting into a slot in the sliding breech, whereby the movement of the breech-block operates the hammer, substantially as set forth.

3. The combination of the sliding breech-block provided with two receptacles, an arm extending into a slot in the breech-block, secured to the shaft carrying the hammer and the trigger, and sear-lever arranged to engage with notches 6 and 9 upon the arm, substantially as described.

4. The combination, with the hammer, sliding breech-block having two receptacles, a trigger, its sear, and a connecting-lever between the breech-block and hammer, of an arm secured thereto and provided with half and full cock notches, and a lip adapted to lock the sear at half-cock, substantially as described.

In testimony whereof I have signed my name to this specification in the presence of two subscribing witnesses.

PATRICK KERRIN,
*Administrator of the estate of Thomas Cullen, deceased.*

Witnesses:
WILLIAM W. NORTHROP,
JACKSON McGLATHERY.